(12) United States Patent
Jacobs

(10) Patent No.: US 7,597,224 B2
(45) Date of Patent: Oct. 6, 2009

(54) GOLF CLUB HOLDER DEVICE, AND METHODS OF CONSTRUCTING AND UTILIZING SAME

(76) Inventor: Paul A. Jacobs, P.O. Box 250, Iron Mountain, MI (US) 49801

( * ) Notice: Subject to any disclaimer, the term of this patent is extended or adjusted under 35 U.S.C. 154(b) by 899 days.

(21) Appl. No.: 11/161,487

(22) Filed: Aug. 5, 2005

(65) Prior Publication Data

US 2007/0029358 A1 Feb. 8, 2007

(51) Int. Cl.
*B60R 9/00* (2006.01)
*B60R 11/00* (2006.01)
*B60R 7/00* (2006.01)

(52) U.S. Cl. .............. 224/274; 224/569; 224/557; 224/517; 211/70.2; 280/47.26; 248/96

(58) Field of Classification Search ........... 224/274, 224/521; 248/96; 211/70.2; 206/615.2; 280/47.26
See application file for complete search history.

(56) References Cited

U.S. PATENT DOCUMENTS

| | | | | |
|---|---|---|---|---|
| 1,717,959 A | * | 6/1929 | Cauffman | 206/315.6 |
| 4,852,896 A | * | 8/1989 | Mills | 280/47.18 |
| 4,997,054 A | * | 3/1991 | Denny et al. | 180/331 |
| 5,213,364 A | | 5/1993 | Theckston | |
| 5,366,075 A | * | 11/1994 | Mills | 206/315.6 |
| 5,573,122 A | | 11/1996 | Williams | |
| 5,582,043 A | * | 12/1996 | McCue et al. | 70/58 |
| 5,671,842 A | * | 9/1997 | Jaworski | 206/315.3 |
| D427,431 S | * | 7/2000 | Jensen | D3/255 |
| 6,102,202 A | * | 8/2000 | Jones | 206/315.6 |
| 6,227,427 B1 | * | 5/2001 | Kunz | 224/547 |
| 6,511,025 B1 | * | 1/2003 | Corey | 248/96 |
| 6,640,970 B1 | | 11/2003 | Townsend, Jr. | |
| 2001/0049949 A1 | * | 12/2001 | Igelmund | 70/58 |
| 2002/0124603 A1 | * | 9/2002 | Yarborough | 70/56 |

FOREIGN PATENT DOCUMENTS

BE 1007348 A6 * 5/1995

* cited by examiner

*Primary Examiner*—Nathan J Newhouse
*Assistant Examiner*—John Cogill
(74) *Attorney, Agent, or Firm*—Weiner & Burt, P.C.; Irving M. Weiner; Pamela S. Burt

(57) ABSTRACT

A riding golf cart club holder for use on a golf cart. The golf clubs are placed in aligned gaskets and tubular structures which prevent the golf clubs from touching each other or rattling. When locked, the golf clubs cannot be unauthorizedly removed from the golf club holder.

20 Claims, 1 Drawing Sheet

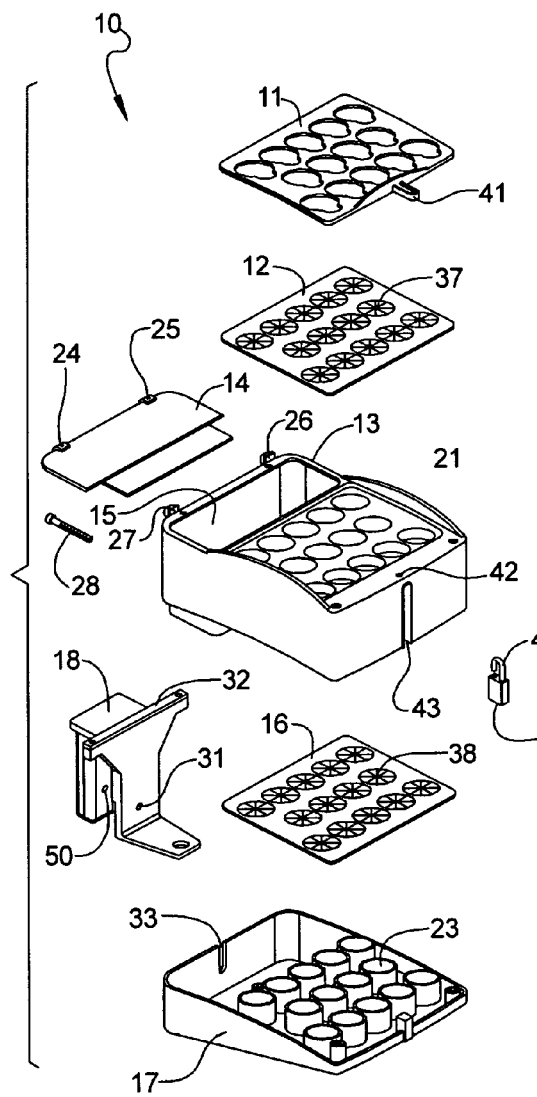
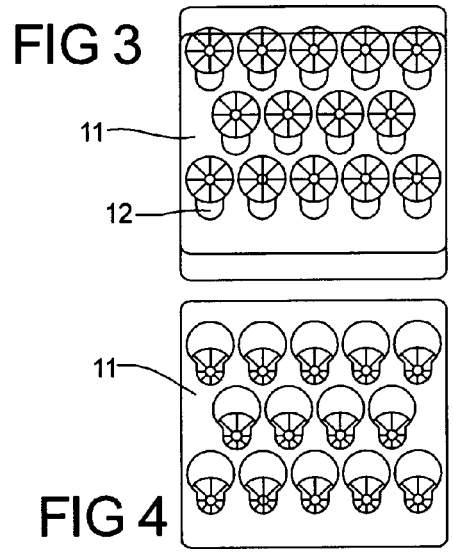
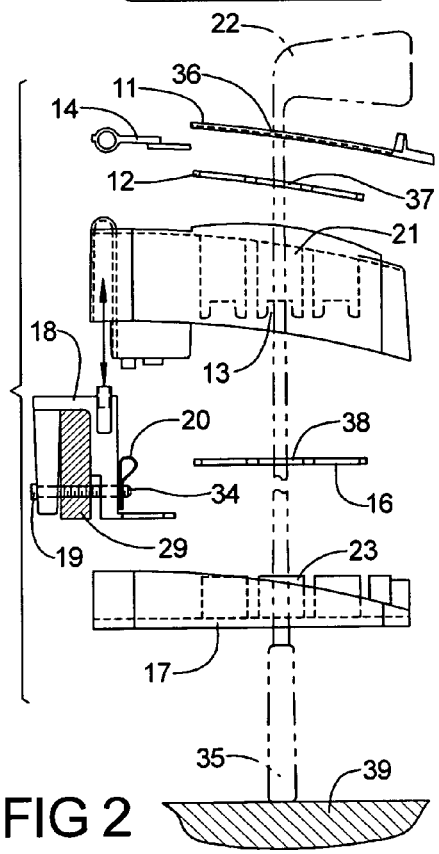
FIG 1
FIG 2
FIG 3
FIG 4

GOLF CLUB HOLDER DEVICE, AND METHODS OF CONSTRUCTING AND UTILIZING SAME

The present invention relates generally to a novel and unique golf club holder device, and methods of constructing and utilizing same.

More particularly, the present invention relates to a golf cart club holder device wherein the clubs may be locked with a slide panel, and do not need to be removed for separate storage when storing the golf cart.

BACKGROUND OF THE INVENTION

At the present time, a golfer first goes to get his golf cart, and then comes to the clubhouse where his golf clubs have been cleaned and stored.

The golfer then plays golf, and when he is done, the golfer goes back to the clubhouse to have his clubs removed and stored again. The golfer then brings his cart to the storage shed.

The present invention eliminates the above-described various steps the golfer goes through.

The prior, but not necessarily relevant, art is exemplified by Theckston U.S. Pat. No. 5,213,364, Williams U.S. Pat. No. 5,573,122, and Townsend, Jr. U.S. Pat. No. 6,640,970.

It is a desideratum of the present invention to avoid the animadversions of the prior art and conventional devices and techniques.

SUMMARY OF THE INVENTION

The present invention provides a riding golf cart club holder device for use in combination with and mounted on a golf cart, comprising: first means for selectively and removably holding therewithin a plurality of golf clubs; second means for selectively and releasably attaching said first means to a golf cart; said first means for holding said plurality of golf clubs includes third means which is slidable within said first means for locking said golf clubs in said first means; and said first means is constructed to permit said golf clubs to extend therethrough so that handle portions of said golf clubs rest upon a substantially horizontal portion of said golf cart.

It is a primary objective of the present invention to provide a riding golf cart club holder device as described hereinabove, which enables the golfer to store safely his golf clubs with his golf cart.

Another object of the present invention is to provide a riding golf cart club holder device as described hereinabove, wherein there is no need of ever removing the clubs for separate storage from the golf cart.

A further object of the present invention is to provide a riding golf cart club holder device as described hereinabove, wherein there is no need for a golf bag.

Yet a further object of the present invention is to provide a riding golf cart club holder device as described hereinabove, wherein the golf clubs when locked with a novel and unique slide panel will never rattle.

Another object of the present invention is to provide a riding golf cart club holder device as described hereinabove, wherein the device is designed to fit over and connect with the rail on the back of the golf cart.

Yet a further object of the present invention is to provide a riding golf cart club holder device as described hereinabove, wherein the device can be carried like a suitcase and transferred to any golf cart.

Another object of the present invention is to provide a riding golf cart club holder device as described hereinabove, wherein the main main purpose is to hold, align, and lock the golf clubs in the device on the back of a riding golf cart.

Further objects, advantages and features of the present invention will become apparent to those persons skilled in this particular area of technology and to others upon referring to the accompanying patent drawings and the following description thereof.

BRIEF DESCRIPTION OF THE DRAWINGS

FIG. 1 is an exploded view showing in perspective various components of the golf club holder in accordance with a preferred embodiment of the present invention.

FIG. 2 is an exploded elevational view, partly in section, to show how the FIG. 1 components function when a golf club is held therein.

FIG. 3 is a top plan view of the sliding door when it is in an open position.

FIG. 4 is a top plan view of the sliding door when it is in a closed position.

DETAILED DESCRIPTION OF THE INVENTION

With reference to the drawings, there is shown a golf club holder 10 in accordance with a preferred embodiment of the present invention.

The golf club holder 10 includes a sliding door 11, a first rubber gasket 12, a main body structure 13, a hinged door structure 14 for a container portion 15 of the main body structure 13, a second or lower rubber gasket 16, a bottom shaft tube plate 17, a clamp structure 18, a bolt 19, a cotter pin 20 for the bolt 19, and a padlock 28.

The main body structure 13 includes a series of tubular compartments 21 for accommodating golf clubs 22 therein.

The bottom shaft tube plate 17 similarly includes a series of tubular structures 23 for accommodating golf clubs 22 therethrough.

The main body structure 13 includes a container portion 15 for holding golf balls, golf tees, and accessories (not shown). The container portion 15 is covered with a hinged door cover arrangement 14 with mating molded plastic hinges 24, 25, 26 and 27 thereon.

"The golf holder 10 is assembled by placing together or interlocking: the main body structure 13, the upper rubber gasket 12, and the sliding door 11; the bottom shaft tube plate 17, the lower rubber gasket 16, and the main body structure 13; the door structure 14 for the container portion 15 of the main body structure 13."

The clamp structure 18 is constructed and dimensioned to fit over and on the rear rail portion 29 of a golf cart.

"The clamp structure 18 is provided with two aligned holes 50 and 31 to accommodate the bolt 19."

"In assembling the clamp structure 18 to the rear rail of the golf cart 29, the bolt 19 is passed through a first clamp hole 50, the golf cart rail 29, the second clamp hole 31, and is retained in position by a cotter pin 20."

The handle portion 35 of the golf clubs 22 are adapted to be inserted through one of the holes 36 in the sliding door 11, through an aligned hole 37 in the upper rubber gasket 12, through the tubular portion 21 of the main body structure 13, through an aligned hole 38, the lower rubber gasket 16, through an aligned tubular portion 23 of the bottom shaft tube plate 17, and to extend therethrough for support on a substantially horizontal portion 39 of a golf cart, such as a rear platform or floor of the golf cart.

FIG. 3 shows the top plan view of a sliding door 11 in its open position for accommodating placing therethrough a series of golf clubs 22.

After the golf clubs 22 have been placed into the golf club holder 10, the sliding door 11 is slid to a door-closed or locked position as shown in FIG. 4. This locks the clubs 22 and the door 11 from opening when the lock 28 is inserted and locked.

To assure that there is no unauthorized removal of the golf clubs 22, the padlock hasp 40 is placed through a padlock holding portion 41 of the sliding door 11, a padlock hole 42 in the main body structure 13, the padlock cavity 43 in the main body structure 13, and the lock 28 is then closed to a locked position.

Thus, it is seen that the golf club holder 10 provides vertical tubes 21, 23 within which to slide golf clubs 22 into, handles 35 first. The two spaced rubber gaskets 12 and 16 inside the golf club holder 10 keep the clubs 22 aligned parallel and prevent the clubs 22 from touching each other.

The handles 35 of the clubs 22 rest on a substantially horizontal portion 39 of the golf cart, such as, for example, the floor of the cart.

It should be noted that the cotter pin 20 holding the bolt 19 is accessible by reaching into the container portion 15 of the main body structure 13.

It should be noted that the sliding door 11 constitutes a sliding panel over the top of the golf club holder 10 within which the golf clubs 22 fit. When the sliding door 11 is slid forward, the clubs 22 become trapped and cannot be removed. Also, at this time the hinged cover 14 over the container portion 15 of the main body structure 13 cannot be opened. When the lock 28 is placed through the sliding door 11 and main body structure 13 and locked, the sliding door 11 cannot be moved, thus, the golf club holder 10 cannot be removed from the cart, and the sliding door or storage cover 11 cannot be opened, and the clubs 22 cannot be removed.

The golf club holder 10 can be easily removed by removing the lock 28, sliding the panel 11 back, removing the cotter pin 20, and removing the bolt 19 from or under the golf cart rail 29. The golf club holder 10 can then be carried like a suitcase and transported to any cart.

The main purpose of the golf club holder 10 is to hold, align and lock the golf clubs 22 on the back of a riding golf cart.

It should also be noted that the golf clubs 22 when inserted in the golf club holder 10 are prevented from any rattling.

There has been illustrated in the accompanying drawings and described hereinabove only one unique and novel embodiment of the present invention which can be practiced and constructed in many different configurations, arrangements of components, sizes, and shapes.

It should be understood that many changes, modifications, variations, and other uses and applications will become apparent to those persons skilled in this particular area of technology and to others after having been exposed to the present patent specification and accompanying drawings.

Any and all such changes, modifications, variations and other uses and applications which do not depart from the spirit and scope of the present invention are therefore covered by and embraced within the present invention and the patent claims set forth hereinbelow.

What is claimed is:

1. A riding golf cart bagless club holder device for use in combination with and mounted on a golf cart, comprising:
   a first mechanism for selectively and removably holding therewithin a plurality of golf clubs;
   a second mechanism for selectively and releasably attaching said first mechanism to a golf cart;
   said second mechanism having an unlocked condition and a locked condition;
   said first mechanism includes an accessory container having a cover which can be locked and unlocked;
   a portion of said second mechanism extends into said accessory container;
   said first mechanism for holding said plurality of golf clubs includes a sliding door which is slidable within said first mechanism for locking said golf clubs in said first mechanism, for unlocking said golf clubs from said first mechanism, and for locking and unlocking said cover of said accessory container;
   said first mechanism is constructed to permit said golf clubs to extend therethrough so that handle portions of said golf clubs rest upon a substantially horizontal portion of said golf cart; and
   a locking device which is placed through said sliding door when it is slid into position to lock said golf clubs in said first mechanism, and to lock said cover of said accessory container and thereby block access to said portion of said second mechanism to prevent unlocking the bagless club holder device from the golf cart.

2. A riding golf cart club holder device according to claim 1, wherein:
   said second mechanism includes a clamp structure which is designed and dimensioned to slidably connect with said first mechanism and to fit over a rail of said golf cart;
   said clamp structure is provided with a selectively removable bolt which removably connects said clamp structure to said rail of said golf cart and is provided with a cotter pin to removably lock said clamp structure to said rail of said golf cart; and
   said portion of said second mechanism that extends into said accessory container comprises said cotter pin and an end part of said selectively removable bolt.

3. A riding golf cart club holder device, according to claim 1, wherein:
   said first mechanism includes a first gasket, a main body structure, a second gasket, and a bottom shaft tube plate which are arranged and constructed to permit each of said golf clubs to be inserted with its associated handle portion first through said sliding door, through said first gasket, through said main body structure, through said second gasket, and through said bottom shaft tube plate, and to rest with said handle portion against said substantially horizontal portion of said golf cart.

4. A riding golf cart club holder device according to claim 3, wherein:
   said locking device comprises a padlock;
   said sliding door is provided with a padlock holding portion; and
   said main body structure is provided with a padlock cavity and a padlock hole which are arranged and dimensioned to permit said padlock to pass through said padlock holding portion of said sliding door after said sliding door has been slid to the position to hold and lock said golf clubs in place, and then through said padlock hole and said padlock cavity to lock said first mechanism to prevent unauthorized removal of said golf clubs from said golf cart holder device.

5. A riding golf cart club holder device according to claim 1, wherein:
   said accessory container cover is a hinged cover.

6. A riding golf cart club holder device according to claim 5, wherein:
   said second mechanism includes a clamp structure which is designed and dimensioned to slidably connect with said first mechanism and to fit over a rail of said golf cart;
   said clamp structure is provided with a selectively removable bolt which removably connects said clamp structure to said rail of said golf cart and is provided with a cotter pin to removably lock said clamp structure to said rail of said golf cart; and said portion of said second mechanism that extends into said accessory container comprises said cotter pin and an end part of said selectively removable bolt.

7. A riding golf cart club holder device, according to claim 6, wherein:
said first mechanism includes a first gasket, a main body structure, a second gasket, and a bottom shaft tube plate which are arranged and constructed to permit each of said golf clubs to be inserted with its associated handle portion first through said sliding door, through said first gasket, through said main body structure, through said second gasket, and through said bottom shaft tube plate, and to rest with said handle portion against said substantially horizontal portion of said golf cart.

8. A riding golf cart club holder device, according to claim 5, wherein:
said first mechanism includes a first gasket, a main body structure, a second gasket, and a bottom shaft tube plate which are arranged and constructed to permit each of said golf clubs to be inserted with its associated handle portion first through said sliding door, through said first gasket, through said main body structure, through said second gasket, and through said bottom shaft tube plate, and to rest with said handle portion against said substantially horizontal portion of said golf cart.

9. A riding golf cart club holder device according to claim 8, wherein:
said locking device comprises a padlock:
said sliding door is provided with a padlock holding portion; and
said main body structure is provided with a padlock cavity and a padlock hole which are arranged and dimensioned to permit a padlock to pass through said padlock holding portion of said sliding door after said sliding door has been slid to the position to hold and lock said golf clubs in place, and then through said padlock hole and said padlock cavity to lock said first mechanism to prevent unauthorized removal of said golf clubs from said golf cart holder device.

10. A riding golf cart club holder device according to claim 1, wherein:
said first mechanism includes a main body structure and a bottom shaft tube plate through which said handle portions of said golf clubs extend.

11. A riding golf cart club holder device according to claim 10, wherein:
said second mechanism includes a clamp structure which is designed and dimensioned to slidably connect with said first mechanism and to fit over a rail of said golf cart;
said clamp structure is provided with a selectively removable bolt which removably connects said clamp structure to said rail of said golf cart and is provided with a cotter pin to removably lock said clamp structure to said rail of said golf cart; and
said portion of said second mechanism that extends into said accessory container comprises said cotter pin and an end part of said selectively removable bolt.

12. A riding golf cart club holder device, according to claim 10, wherein:
said first mechanism includes a first gasket, said main body structure, a second gasket, and said bottom shaft tube plate which are arranged and constructed to permit each of said golf clubs to be inserted with its associated handle portion first through said sliding door, through said first gasket, through said main body structure, through said second gasket, and through said bottom shaft tube plate, and to rest with said handle portion against said substantially horizontal portion of said golf cart.

13. A riding golf cart club holder device according to claim 12, wherein:
said locking device comprises a padlock;
said sliding door is provided with a padlock holding portion; and
said main body structure is provided with a padlock cavity and a padlock hole which are arranged and dimensioned to permit a padlock to pass through said padlock holding portion of said sliding door after said sliding door has been slid to the position to hold and lock said golf clubs in place, and then through said padlock hole and said padlock cavity to lock said first mechanism to prevent unauthorized removal of said golf clubs from said golf cart holder device.

14. A riding golf cart club holder device according to claim 10, wherein:
said accessory container cover is a hinged cover.

15. A riding golf cart club holder device according to claim 14, wherein:
said second mechanism includes a clamp structure which is designed and dimensioned to slidably connect with said first mechanism and to fit over a rail of said golf cart;
said clamp structure is provided with a selectively removable bolt which removably connects said clamp structure to said rail of said golf cart and is provided with a cotter pin to removably lock said clamp structure to said rail of said golf cart; and
said portion of said second mechanism that extends into said accessory container comprises said cotter pin and an end part of said selectively removable bolt.

16. A riding golf cart club holder device, according to claim 15, wherein:
said first mechanism includes a first gasket, said main body portion, a second gasket, and said bottom shaft tube plate which are arranged and constructed to permit each of said golf clubs to be inserted with its handle portion first through said sliding door, said first gasket, said main body portion, said second gasket and said bottom shaft tube plate, and to rest with the golf head handle portion against said horizontal portion of said golf cart.

17. A riding golf cart club holder device, according to claim 14, wherein:
said first mechanism includes a first gasket, said main body portion, a second gasket, and said bottom shaft tube plate which are arranged and constructed to permit each of said golf clubs to be inserted with its handle portion first through said sliding door, said first gasket, said main body portion, said second gasket and said bottom shaft tube plate, and to rest with the golf head handle portion against said horizontal portion of said golf cart.

18. A riding golf cart club holder device according to claim 17, wherein:
said locking device comprises a padlock:
said sliding door is provided with a padlock holding portion; and
said main body structure is provided with a padlock cavity and a padlock hole which are arranged and dimensioned to permit a padlock to pass through said padlock holding portion of said sliding door after said sliding door has been slid to the position to hold and lock said golf clubs in place, and then through said padlock hole and said padlock cavity to lock said first mechanism to prevent unauthorized removal of said golf clubs from said golf cart holder device, to prevent opening of said hinged cover, to prevent access to interior portions of said main body structure, to prevent access to said cotter pin, and to prevent unauthorized removal of the bagless club holder device from said golf cart.

19. A riding golf cart bagless club holder device for use in combination with and mounted on a golf cart, comprising:
- a first mechanism for selectively and removably holding therewithin a plurality of golf clubs;
- said first mechanism includes a container portion for holding golf balls, golf tees and accessories, and said container portion is provided with a hinged cover;
- a second mechanism for selectively and releasably attaching said first mechanism to a golf cart;
- said second mechanism includes a clamp structure which is designed and dimensioned to slidably connect with said first mechanism and to fit over and on a rear rail of said golf cart;
- said clamp structure is provided with a selectively removable bolt which removably connects said clamp structure to said rail of said golf cart and is provided with a cotter pin to removably lock said clamp structure to said rail of said golf cart;
- said first mechanism for holding said plurality of golf clubs includes a sliding door which is slidable within said first mechanism for locking said golf clubs in said first mechanism; and
- said first mechanism is constructed to permit said golf clubs to extend therethrough so that handle portions of said golf clubs rest upon a substantially horizontal portion of said golf cart;
- said first mechanism includes a main body structure and a bottom shaft tube plate through which said handle portions of said golf clubs extend;
- said first mechanism includes a first gasket, said main body structure, a second gasket, and said bottom shaft tube plate which are arranged and constructed to permit each of said golf clubs to be inserted with its associated handle portion first through said sliding door, through said first gasket, through said main body structure, through said second gasket, and through said bottom shaft tube plate, and to rest with said handle portion against said substantially horizontal portion of said golf cart;
- said sliding door is provided with a padlock holding portion; and
- said main body structure is provided with a padlock cavity and a padlock hole which are arranged and dimensioned to permit a padlock to pass through said padlock holding portion of said sliding door after said sliding door has been slid to a position to hold and lock said golf clubs in place and prevent opening of said hinged cover, and then through said padlock hole and said padlock cavity to lock said first mechanism to prevent unauthorized removal of said golf clubs from the bagless club holder device.

20. A riding golf cart bagless club holder device for use in combination with and mounted on a golf cart, comprising:
- a first mechanism for selectively and removably holding therewithin a plurality of golf clubs;
- said first mechanism includes a container portion for holding golf balls, golf tees and accessories, and said container portion is provided with a hinged cover;
- a second mechanism for selectively and releasably attaching said first mechanism to a golf cart;
- said second mechanism includes a clamp structure which is designed and dimensioned to slidably connect with said first mechanism and to fit over and on a rear rail of said golf cart;
- said clamp structure is provided with a selectively removable bolt which removably connects said clamp structure to said rail of said golf cart and is provided with a cotter pin to removably lock said clamp structure to said rail of said golf cart;
- said first mechanism for holding said plurality of golf clubs includes a sliding door which is slidable within said first mechanism for locking said golf clubs in said first mechanism; and
- said first mechanism is constructed to permit said golf clubs to extend therethrough so that handle portions of said golf clubs rest upon a substantially horizontal portion of said golf cart;
- said first mechanism includes a main body structure and a bottom shaft tube plate through which said handle portions of said golf clubs extend;
- said first mechanism includes a first gasket, said main body structure, a second gasket, and said bottom shaft tube plate which are arranged and constructed to permit each of said golf clubs to be inserted with its associated handle portion first through said sliding door, through said first gasket, through said main body structure, through said second gasket, and through said bottom shaft tube plate, and to rest with said handle portion against said substantially horizontal portion of said golf cart;
- said sliding door is provided with a padlock holding portion; and
- said main body structure is provided with a padlock cavity and a padlock hole which are arranged and dimensioned to permit a padlock to pass through said padlock holding portion of said sliding door after said sliding door has been slid to a position to hold and lock said golf clubs in place, and then through said padlock hole and said padlock cavity to lock said first mechanism to prevent unauthorized removal of said golf clubs from said golf cart holder device, to prevent opening of said hinged cover blocking access to interior portions of said main body structure, to prevent access to said cotter pin, and to prevent unauthorized removal of the bagless club holder device from the golf cart.

* * * * *